(12) United States Patent
Balin et al.

(10) Patent No.: US 12,292,759 B1
(45) Date of Patent: May 6, 2025

(54) SECURE TIME SYNCHRONIZATION WITH AN EDGE ORCHESTRATOR

(71) Applicant: Dell Products L.P., Round Rock, TX (US)

(72) Inventors: Maxim Balin, Gan-Yavne (IL); Nechami Maman, Jerusalem (IL); Emmanuel Andre, Singapore (SG)

(73) Assignee: Dell Products L.P., Round Rock, TX (US)

( * ) Notice: Subject to any disclaimer, the term of this patent is extended or adjusted under 35 U.S.C. 154(b) by 98 days.

(21) Appl. No.: 18/495,150

(22) Filed: Oct. 26, 2023

(51) Int. Cl.
*G06F 1/12* (2006.01)

(52) U.S. Cl.
CPC .................... *G06F 1/12* (2013.01)

(58) Field of Classification Search
CPC ............... G06F 1/32; G06F 1/12; G06F 9/44
See application file for complete search history.

(56) References Cited

U.S. PATENT DOCUMENTS

| 2008/0168182 A1* | 7/2008 | Frank | G06F 1/12 |
| | | | 370/254 |
| 2015/0256603 A1* | 9/2015 | Pillai | H04W 4/60 |
| | | | 709/246 |

\* cited by examiner

*Primary Examiner* — Keshab R Pandey
(74) *Attorney, Agent, or Firm* — WOMBLE BOND DICKINSON (US) LLP

(57) ABSTRACT

Methods and systems for securing edge devices are disclosed. The edge devices may be secured by facilitating time synchronization of the edge devices through an edge orchestrator. The edge orchestrator may securely perform time synchronization with a trusted time server. The edge orchestrator may obtain a true time value from the trusted time server and verify the integrity of the true time value using security processes. Once the integrity of the true time value has been verified, then the edge devices may obtain the true time value from the edge orchestrator through secure communication channels. After the edge devices obtain the true time value from the edge orchestrator, the edge device may perform time synchronization.

20 Claims, 6 Drawing Sheets

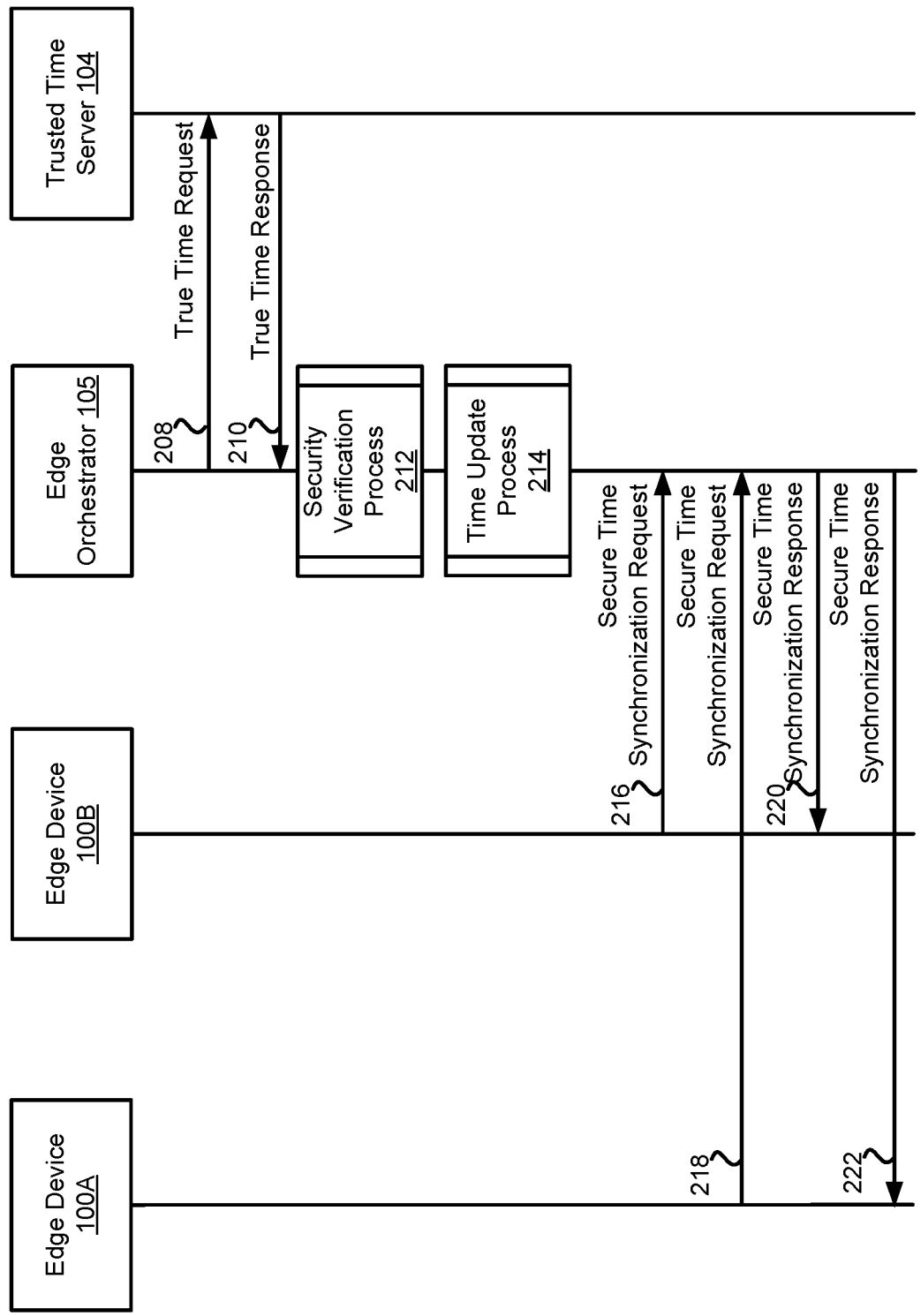

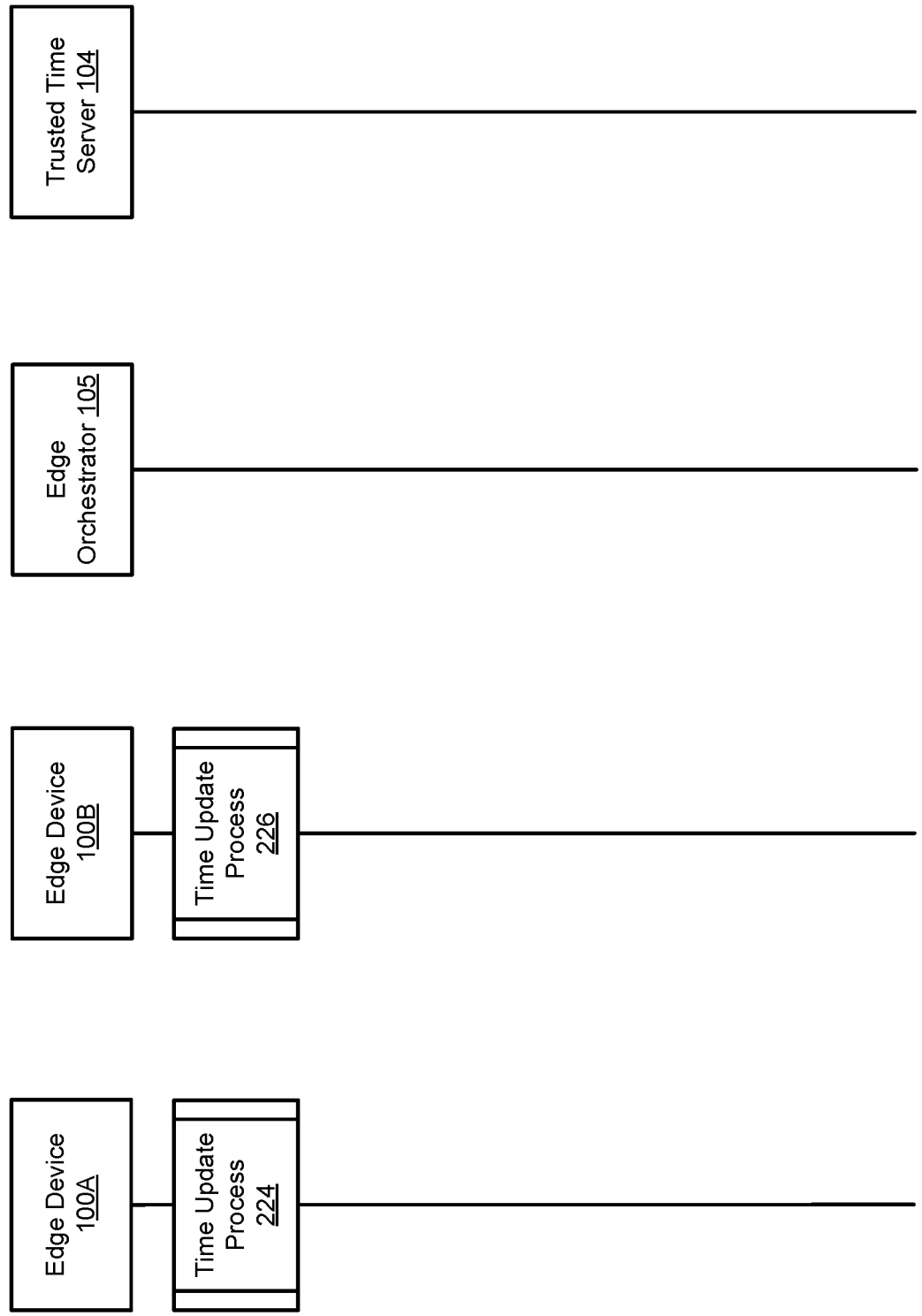

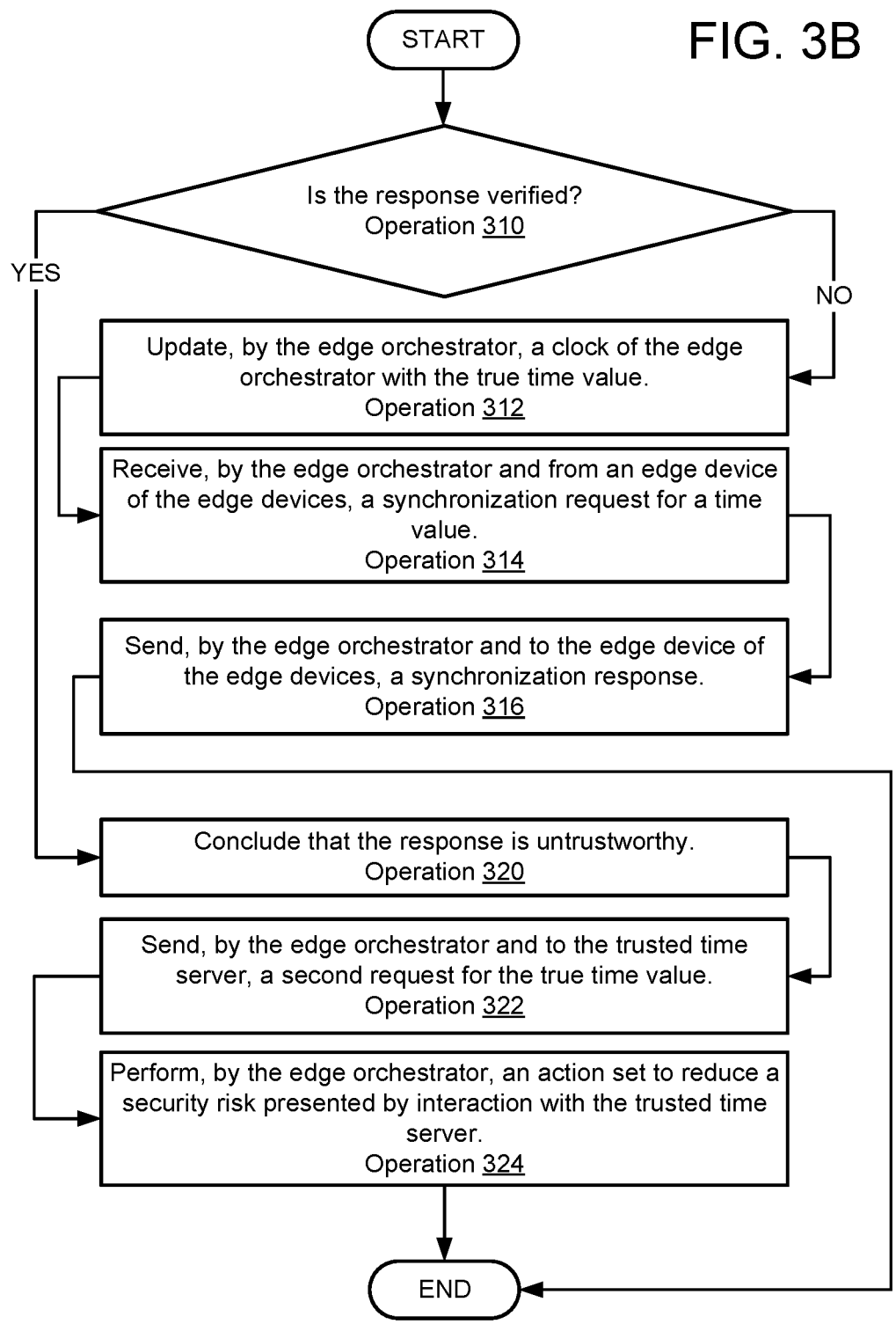

SECURE TIME SYNCHRONIZATION WITH AN EDGE ORCHESTRATOR

FIELD

Embodiments disclosed herein relate generally to securing time synchronization. More particularly, embodiments disclosed herein relate to implementing a true time value using an edge orchestrator.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 2A-2B shows interaction diagrams illustrating operation of a system in accordance with an embodiment.

FIG. 3A-3B shows a flow diagram illustrating a method in accordance with an embodiment.

DETAILED DESCRIPTION

Figure 1:
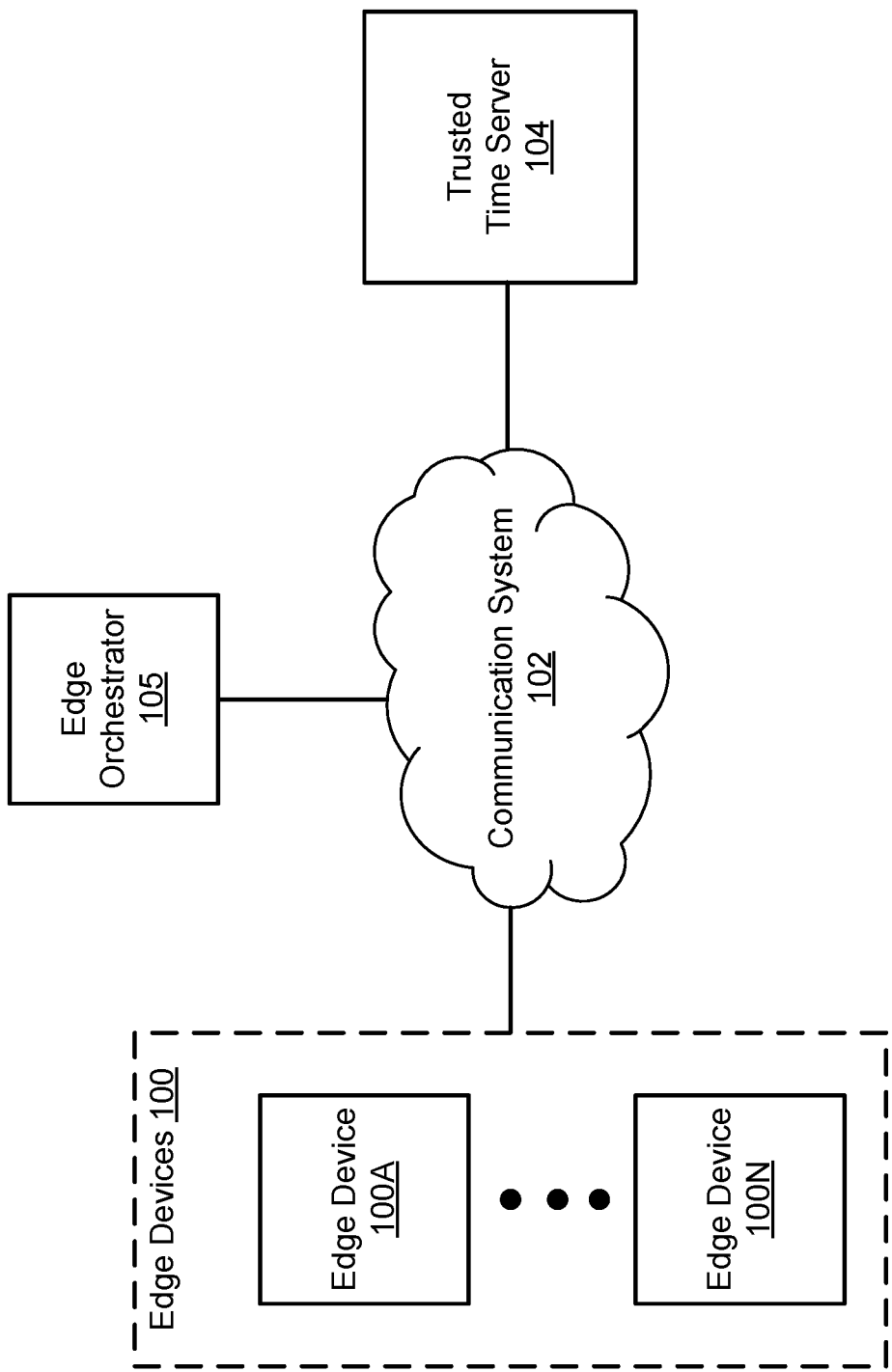
FIG. 1 shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for securing time synchronization. Time synchronization may be secured through implementation of an edge orchestrator. Implementation of the edge orchestrator may mitigate security risks of time synchronization for edge devices.

Edge devices may require time synchronization to perform tasks. By design, edge devices perform tasks with limited communication to the outside world. The communication to the outside world permitted by the edge devices may be limited to functions performed by the edge devices and an edge orchestrator that facilitates operations of the edge devices.

To perform the functions and collaborate with other edge devices, the edge devices may require that time on the edge devices be synchronized. To synchronize the time, the edge devices may rely on the edge orchestrator to communicate with the outside world. In communicating with the outside world, the edge orchestrator may communicate with a trusted time server that tracks a global standard time.

By communicating with the trusted time server, the edge orchestrator may request a true time value. The edge orchestrator may receive a response from the trusted time server that includes the true time value. The true time value may be evaluated by the edge orchestrator. In evaluating the integrity of the true time value, the edge orchestrator may ensure the true time value is valid and has not been compromised. In the event of compromise of the true time value, the edge orchestrator may perform an action set of security protocols to prevent compromise by malicious attacks.

As the edge orchestrator has the true time value, the edge devices may send requests to the edge orchestrator for the true time value. The edge devices may send requests through secure communication channels to the edge orchestrator. The edge orchestrator may respond with the true time value to the edge devices. The edge devices may receive the true time value and perform time synchronization to facilitate operations and collaboration with other edge devices.

In an embodiment, a method for securing edge devices is provided. The method may include (i) sending, by an edge orchestrator and to a trusted time server, a request for a true time value; (ii) receiving, by the edge orchestrator and from the trusted time server, a response that comprises the true time value; (iii) performing, by the edge orchestrator, a security verification process on the response from the trusted time server to verify integrity of the response; (iv) making, by the edge orchestrator, a determination whether the integrity of the response is verified; (v) in a first instance of the determination where the integrity of the response is verified: (a) updating, by the edge orchestrator, a clock of the edge orchestrator with the true time value to obtain an updated clock; (b) receiving, by the edge orchestrator and from an edge device of the edge devices, a synchronization request for a time value; and (c) sending, by the edge orchestrator and to the edge device of the edge devices, a synchronization response using the updated clock.

The method may further include, in a second instance of the determination where the integrity of the response is not verified, concluding that the response is untrustworthy.

The method may further include, in a second instance of the determination where the integrity of the response is not verified, sending, by the edge orchestrator and to the trusted time server, a second request for the true time value.

The method may further include, in a second instance of the determination where the integrity of the response is not verified, performing, by the edge orchestrator, an action set to reduce a security risk presented by interaction with the trusted time server.

The method may further include (i) receiving, by the edge device of the edge devices, the synchronization response; and (ii) updating, by the edge device of the edge devices, a clock of the edge device of the edge devices with the time value.

The trusted time server maintains a globally-implemented time standard and provides information regarding the globally-implemented time standard.

Performing the security verification process may include implementing one or more authentication procedures on a data package that carries the true time value to ensure the true time value has not been compromised by a third-party entity.

Synchronization request and the synchronization response are carried via a communication channel between the edge device and the orchestrator, the communication channel being secured with an encryption scheme for secure communication between the edge orchestrator and the edge devices, and communication is secured with at least one communication port restriction for communications.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

To provide computer implemented services, the system of FIG. 1 may include edge devices 100. Edge devices 100 may perform computer implemented services by generating data, communicating between edge devices and the outside world, and monitoring and troubleshooting processes. Data may be generated from processes that may be performed by edge devices 100. Edge devices 100 may share the data among other edge devices of edge devices 100 and may have limited communications outside of edge devices 100. The data may be used in monitoring and troubleshooting processes by edge devices 100.

To provide the computer implemented services, edge devices 100 may need to synchronize time with one another. Time synchronization may enable precise coordination of implementation of processes and data sharing between edge devices 100. The processes may require recordkeeping of implementation steps and therefore may rely on accurate timekeeping by edge devices 100. Further, data sharing between edge devices 100 may require timekeeping to enable assessment of the productivity and output of processes at specific times.

To perform processes and data sharing, time may be expected to be synchronized between edge devices 100. If edge devices 100 has the time synchronized, then processes may be performed cooperatively, and data may be generated and shared between every device of edge devices 100.

However, if edge devices 100 are unable to keep time synchronization between other devices of edge devices 100, then edge devices 100 may be unable to perform desired processes and/or the processes may be performed in an undesired manner (e.g., with errors, may be impaired, etc.).

To synchronize their time, edge devices 100 may attempt to do so by contacting time management entities which may be remote to edge devices 100. However, doing so may require that edge devices 100 communicate with a variety of remote entities.

Communicating with remote entities may subject edge devices 100 to risk of compromise. For example, a malicious device may attempt to impersonate a remote time management entity. If successful, edge devices 100 may contact the malicious device which may use the aforementioned contact to attempt to compromise edge devices 100.

In general, embodiments disclosed here relate to systems and methods for time synchronization of edge devices. The time synchronization of edge devices 100 may be facilitated by a single device, such as an edge orchestrator (e.g., 105). The edge orchestrator request a true time value from trusted time server 104 and may include various security features to reduce the risk of compromise of the edge orchestrator.

Through the request for the true time value from trusted time server 104, the edge orchestrator may receive a data package that may include the true time value from trusted time server 104. The true time value may be from a globally-recognized standard, such as Universal Coordinated Time (UTC).

The data package, which may include the true time value, received by the edge orchestrator may be subjected to an action set of security procedures. The action set of security procedures may reduce the likelihood that the data package is malicious. If the action set of security procedures clears the data package, then the edge orchestrator may set the time of an internal clock to the true time value and/or otherwise the data included in the data package to assist in synchronizing the times of other entities. Otherwise, if the action set of security procedures does not clear the data package, then (i) the edge orchestrator may not set the time of the internal clock to the true time value (and/or otherwise trust the data package), and (ii) the edge orchestrator may implement another action set of security procedures concerning communication with trusted time server 104.

Each device of edge devices 100 may be operably connected to the edge orchestrator by a secure communication channel. Using the secure connections, edge devices 100 may send time synchronization requests to the edge orchestrator. The time synchronization requests may be sent through a predesignated port and encrypted for secure communication.

The edge orchestrator may receive the time synchronization requests from edge devices 100. In response, the edge orchestrator may send corresponding time synchronization responses that include the true time value. Like with the time synchronization requests, the time synchronization responses may be sent through a pre-designated port (e.g., of the edge devices) and encrypted for secure communication.

Because the edge orchestrator is a trusted entity to edge devices 100, each edge device of edge devices 100 may extract the true time value from the response and synchronize an internal clock with the true time value. Thus, synchronization of the internal clock of every edge device of edge devices 100 may be facilitated through a single device, the edge orchestrator, which communicates to trusted time server 104.

By doing so, the edge devices may be subjected to greatly reduced risk of compromise without requiring that each of the edge devices implement various security procedures otherwise required to mitigate risk of compromise when contacting time servers. Accordingly, the computational overhead for synchronizing time across edge devices may be reduced when compared to requiring that each edge devices separately synchronize their time with time servers.

To provide the above noted functionality, the system may include edge devices 100 and trusted time server 104. Each of these components is discussed below.

Edge devices 100 may include any number of edge device 100A-100N. Edge device 100A-100N may provide computer implemented services be (i) implementing, monitoring and troubleshooting processes, (ii) generating data, and (iii) coordinating processes between other devices of edge devices 100. Edge devices 100 may be implemented in locations with limited communication between devices other than devices of edge device 100 and an edge orchestrator. The edge orchestrator may facilitate processes between edge devices 100 and may provide services using processes that interact with the outside world, such as time synchronization as described above.

Additionally, edge devices 100 may cooperatively synchronize their time with an edge orchestrator (not shown). The edge orchestrator may be trusted entity that may serve as the source of true time for edge devices 100.

Trusted time server 104 may (i) maintain a globally-implemented time standard and (ii) provide information regarding the globally-implemented time standard to other entities. The globally-implemented time standard may be provided to edge orchestrator 105 and/or another device.

Edge orchestrator 105 may cooperate with trusted time server 104 and edge devices 100 to synchronize the time of edge devices 100. To do so, edge orchestrator 105 may obtain the true time from trusted time services 104 while performing various security procedures to mitigate the risk of compromise of edge orchestrator. Once obtained, edge orchestrator 105 may distribute the true time to edge devices 100 via secure communication channels. By doing so, edge devices 100 may only need to utilize limited security procedures to mitigate the risk of compromise presented by communicating with edge orchestrator 105.

When providing their functionality, any of (and/or components thereof) edge devices 100, trusted time server 104, and edge orchestrator 105 may perform all, or a portion, of the actions and methods illustrated in FIGS. 2A-3B.

Any of (and/or components thereof) edge devices 100 and trusted time server 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

While illustrated in FIG. 1 as including a limited number of specific components, a system in accordance with an embodiment may include fewer, additional, and/or different components than those components illustrated therein.

Thus, as shown in FIG. 1, a system in accordance with an embodiment may facilitate time synchronization for edge devices 100 through obtaining a true time value from a trusted time server by an edge orchestrator (e.g., with heavier weight security features) and distribute the true time to edge devices (e.g., with lighter weight security features) to facilitate time synchronization while limiting computational overhead.

To further clarify embodiments disclosed herein, interactions diagrams in accordance with an embodiment are shown in FIGS. 2A-2B. These interactions diagrams may illustrate how data may be obtained and used within the system of FIG. 1.

In the interaction diagrams, processes performed by and interactions between components of a system in accordance with an embodiment are shown. In the diagrams, components of the system are illustrated using a first set of shapes (e.g., 100A, 204, etc.), located towards the top of each figure. Lines descend from these shapes. Processes performed by the components of the system are illustrated using a second set of shapes (e.g., 212, 214, etc.) superimposed over these lines. Interactions (e.g., communication, data transmissions, etc.) between the components of the system are illustrated using a third set of shapes (e.g., 208, 210, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 208 may occur prior to the interaction labeled as 210. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate processes and interactions that may occur during time synchronization of edge devices from edge devices 100 through an edge orchestrator.

Edge orchestrator 204, at interaction 208, may make a true time request with trusted time server 104. The true time request may be a request for a true time value from trusted time server 104 by which to perform time synchronization. Trusted time server 104 may respond, at interaction 210, with a true time response. The true time response may include a data package that includes the true time value in a globally-recognized standard.

Upon receiving true time response 210 from trusted time server 104, edge orchestrator 204 may perform security verification process 212. During security verification process 212, an action set of security operations to ensure the integrity of the true time response may be performed. For example, security verification process 212 may include performing deep packet inspection for received data units that carry the true time response to edge orchestrator 105, malware/virus scanning of the true time response, may implement rotating security protocols, and/or may perform other activities for mitigating threats due to operably connecting to remote devices but that may incur significant computational overhead.

If edge orchestrator 204 is not able to verify the integrity of the true time response, edge orchestrator 204 may send another request of true time request 208 to trusted time server 104. If edge orchestrator 204 further finds that the true time response is compromised, then edge orchestrator 204 may conclude that the true time response is untrustworthy and may perform an action set to reduce the possibility of a security risk due to the true time response.

However, upon successful completion (e.g., determining that the true time response is trustworthy) of security verification process 212, edge orchestrator 204 may perform time update process 214. During time update process 214, the clock used by edge orchestrator 204 (and/or time correction data for the clock may be generated/stored so that the true time may be derived from the time provided by the clock).

The processes and interactions (e.g., 208-214) may be performed over time to allow edge orchestrator 105 to provide true time to various edge devices. Consequently, when the edge devices send requests to edge orchestrator 204 to obtain the true time value edge orchestrator 105 may be in condition to service the requests.

For example, as part of a time synchronization process, edge device 100A may send, at interaction 216, a secure time synchronization request 218 to edge orchestrator 204 and edge device 100B may send, at interaction 218, another secure time synchronization request to edge orchestrator 204. These secure time synchronization requests may be encrypted and sent through secure communication channel through specific ports of the respective edge devices.

When received, edge orchestrator 204 may respond, at interactions 220-222 with secure time synchronization response. The secure time synchronization responses may also be encrypted and sent through a secure communication channel through the specific ports. The secure time synchronization responses may include data packages that include the true time value as maintained by edge orchestrator 105. The true time value may be taken not from the clock in edge orchestrator 204 but directly from true time response 210 after security verification process 212 has ensured the integrity of the data package received by edge orchestrator 204.

Thus, using the interaction diagram shown in FIG. 2A, embodiments disclosed herein may illustrate processes and interactions that may occur during time synchronization of edge devices from edge devices 100 through an edge orchestrator.

Turning to FIG. 2B, a second interaction diagram in accordance with an embodiment is shown. The second interaction diagram may illustrate processes and interactions that may occur during time synchronization of edge devices from edge devices 100 through an edge orchestrator. The second interaction diagram may be a continuation of the interaction diagram shown in FIG. 2B.

Once the response are obtained by the edge devices, the true time value may be extracted from the data package. With the true time value extracted from each response, edge devices 100A-100B may perform time update processes 224-226, respectively. During time update processes 224-226, each edge device may synchronize its time to the true time value. The edge devices may do so by updating their clocks and/or maintaining information usable to derive the true time based on the time maintained by their respective clocks.

Once obtained, the true time values may be used by the edge devices to perform various processes such as, for example, time stamping data units, adding the time to various data structures, deriving information from the true time, and/or otherwise utilizing the synchronized true time to provide desired computer implemented services.

Thus, using the interaction diagram shown in FIG. 2B, embodiments disclosed herein may illustrate processes and interactions that may occur during time synchronization of edge devices from edge devices 100 through an edge orchestrator.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3A:
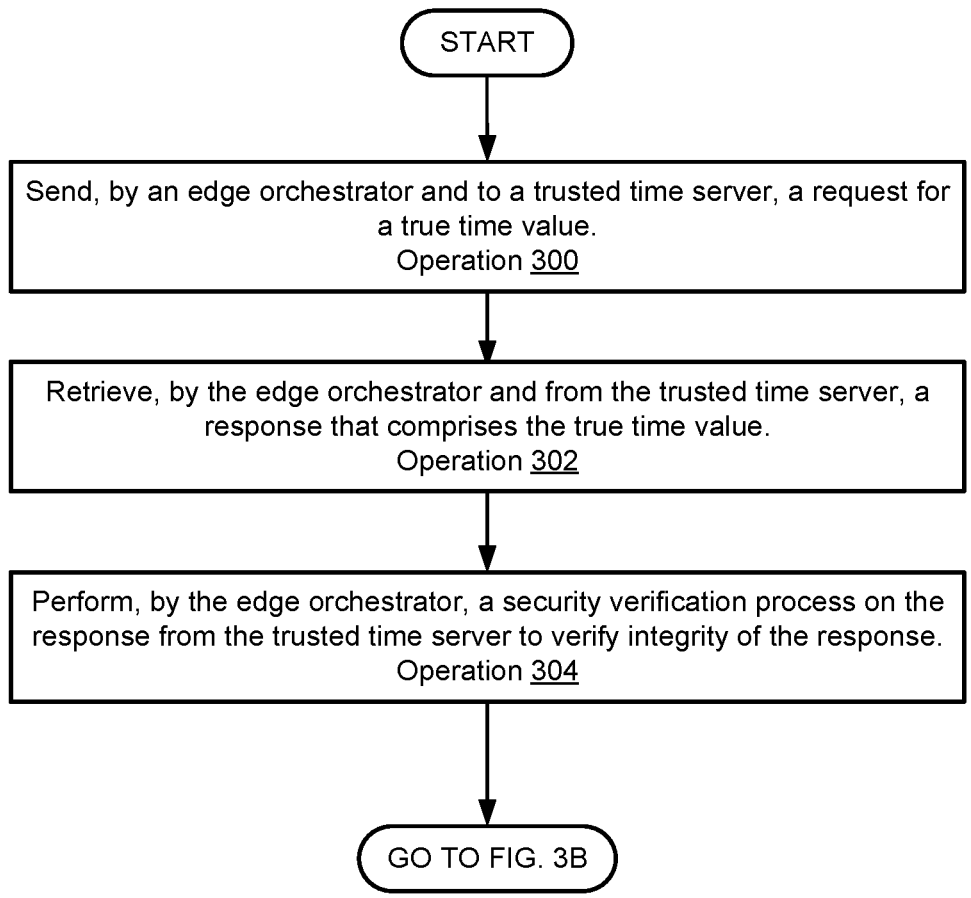

As discussed above, the components of FIG. 1 may perform various methods to store data in distributed systems using a distributed deduplication framework. FIGS. 3A-3B illustrate methods that may be performed by the components of the system of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a first flow diagram illustrating a method of securing edge devices in accordance with an embodiment is shown. The method may be performed, for example, by any of the components of the system of FIG. 1, and/or other components not shown therein.

At operation 300, a request for a true time value may be sent by an edge orchestrator to a trusted time server. The request may be sent by generating a data package that includes a request for the true time value and sending it to the trusted time server.

At operation 302, a response that includes the true time value may be retrieved by the edge orchestrator and from the trusted time server. A response may be retrieved by receiving a data package from the trusted time server.

A security verification process may be performed by the edge orchestrator on the response from the trusted time server to verify the integrity of the response. The security process may be performed by implementing one or more authentication procedures on the data package that carries the true time value to ensure the true time value has not been compromised by a third-party entity. One or more authentication procedures may be implemented by executing security applications to ensure the data package has not been compromised and that the source of the data package is trustworthy.

Turning to FIG. 3B, FIG. 3B may show a continuation of the flow diagram shown in FIG. 3A.

At operation 310, a determination may need to be made whether the response may be verified. The determination may be made by assessing results of the security process and verifying the quality of the integrity of the response based on the results of the security process.

If the response has been verified, the method may continue at operation 320. Otherwise, if the response has not been verified, the method may continue at operation 320.

At operation 320, the response may be concluded to be untrustworthy. The response may be concluded to be untrustworthy by not verifying, by the edge orchestrator, the integrity of the response from the trusted time server.

At operation 322, a second request may be sent by the edge orchestrator and to the trusted time server for the true time value. The second request may be sent by generating another data package that includes a new request for the true time value and sending it to the trusted time server.

At operation 324, an action set may be performed by the edge orchestrator to reduce a security risk presented by the interaction with the trusted time server. The action set may be performed by implementing security protocols that govern transmission of data packages with the trusted time server.

The method may end following operation 324.

Returning to operation 310, at operation 312, a clock of the edge orchestrator may be updated with the true time value by the edge orchestrator. The clock may be updated, after verification of the response by the trusted time server, by synchronizing the clock of the edge orchestrator with the true time value.

At operation 314, a synchronization request for a time value may be received by the edge orchestrator and from an edge device of edge devices. The synchronization request may be received by acquiring the synchronization request from the edge device through a secure communication channel.

At operation 316, a synchronization response may be sent by the edge orchestrator and to the edge devices. The synchronization response may be sent by generating a data package with the true time value and passing the data package through the secure communication channel to the edge device of the edge devices.

The method may end following operation 326.

Figure 4:
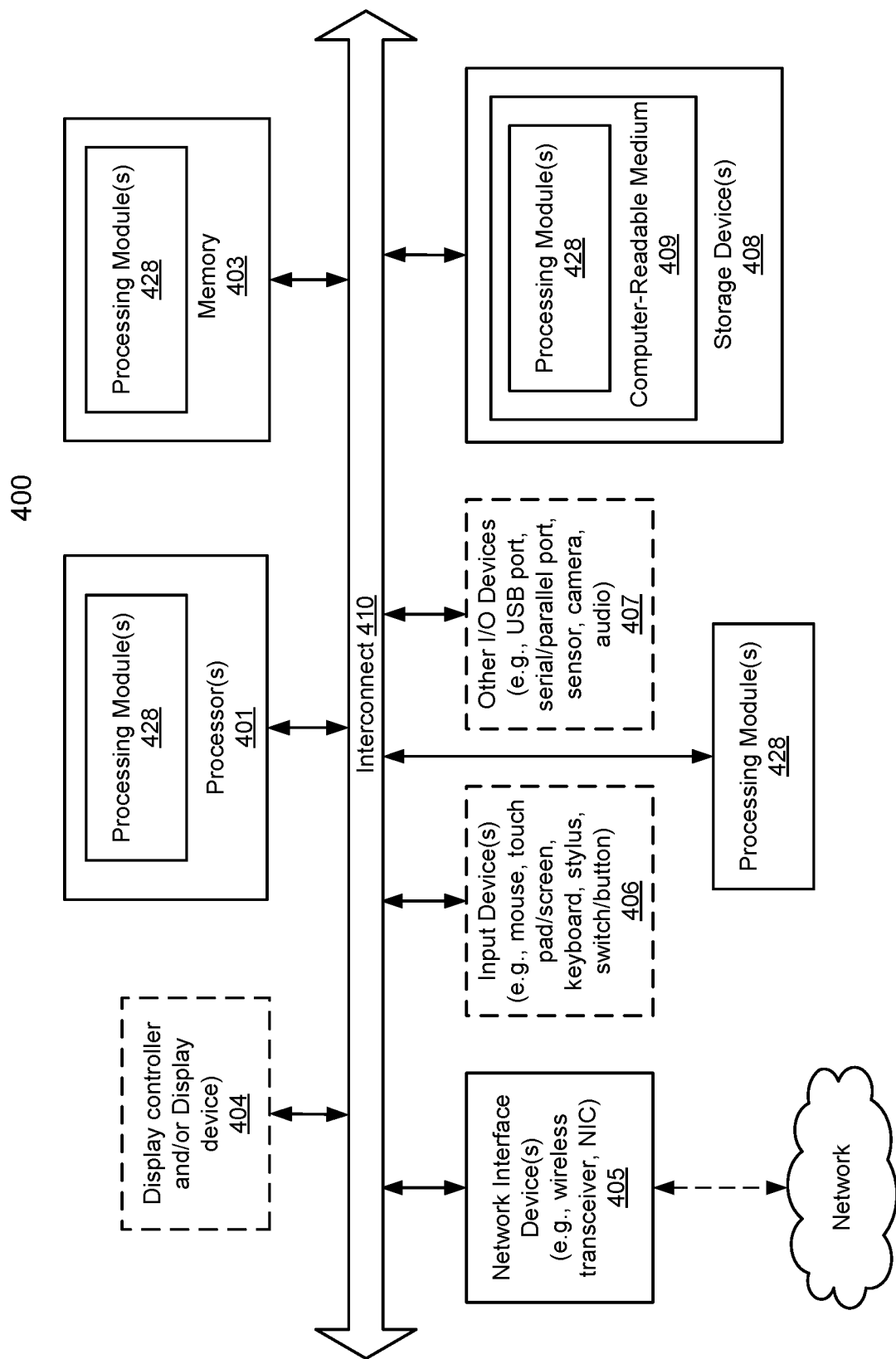
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for securing edge devices, the method comprising:
   sending, by an edge orchestrator and to a trusted time server, a request for a true time value;
   receiving, by the edge orchestrator and from the trusted time server, a response that comprises the true time value;
   performing, by the edge orchestrator, a security verification process on the response from the trusted time server to verify integrity of the response;
   making, by the edge orchestrator, a determination whether the integrity of the response is verified;
   in a first instance of the determination where the integrity of the response is verified:
      updating, by the edge orchestrator, a clock of the edge orchestrator with the true time value to obtain an updated clock;
      receiving, by the edge orchestrator and from an edge device of the edge devices, a synchronization request for a time value; and
      sending, by the edge orchestrator and to the edge device of the edge devices, a synchronization response using the updated clock.

2. The method of claim 1, further comprising:
   in a second instance of the determination where the integrity of the response is not verified:
      concluding that the response is untrustworthy.

3. The method of claim 2, further comprising:
   in the second instance of the determination where the integrity of the response is not verified:
      sending, by the edge orchestrator and to the trusted time server, a second request for the true time value.

4. The method of claim 2, further comprising:
   in the second instance of the determination where the integrity of the response is not verified:
      performing, by the edge orchestrator, an action set to reduce a security risk presented by interaction with the trusted time server.

5. The method of claim 1, further comprising:
   receiving, by the edge device of the edge devices, the synchronization response; and
   updating, by the edge device of the edge devices, a clock of the edge device of the edge devices with the time value.

6. The method of claim 1, wherein the trusted time server maintains a globally-implemented time standard and provides information regarding the globally-implemented time standard.

7. The method of claim 1, wherein performing the security verification process comprises:
   implementing one or more authentication procedures on a data package that carries the true time value to ensure the true time value has not been compromised by a third-party entity.

8. The method of claim 1, wherein the synchronization request and the synchronization response are carried via a communication channel between the edge device and the edge orchestrator, the communication channel being secured with an encryption scheme for secure communication between the edge orchestrator and the edge devices, and communication is secured with at least one communication port restriction for communications.

9. A non-transitory machine-readable medium having instructions stored therein, which when executed by a processor, cause the processor to perform operations for securing edge devices, the operation comprising:
   sending, by an edge orchestrator and to a trusted time server, a request for a true time value;
   receiving, by the edge orchestrator and from the trusted time server, a response that comprises the true time value;
   performing, by the edge orchestrator, a security verification process on the response from the trusted time server to verify integrity of the response;
   making, by the edge orchestrator, a determination whether the integrity of the response is verified;
   in a first instance of the determination where the integrity of the response is verified:
      updating, by the edge orchestrator, a clock of the edge orchestrator with the true time value to obtain an updated clock;
      receiving, by the edge orchestrator and from an edge device of the edge devices, a synchronization request for a time value; and
      sending, by the edge orchestrator and to the edge device of the edge devices, a synchronization response using the updated clock.

10. The non-transitory machine-readable medium of claim 9, further comprising:
    in a second instance of the determination where the integrity of the response is not verified:
       concluding that the response is untrustworthy.

11. The non-transitory machine-readable medium of claim 10, further comprising:
    in the second instance of the determination where the integrity of the response is not verified:
       sending, by the edge orchestrator and to the trusted time server, a second request for the true time value.

12. The non-transitory machine-readable medium of claim 10, further comprising:
    in the second instance of the determination where the integrity of the response is not verified:
       performing, by the edge orchestrator, an action set to reduce a security risk presented by interaction with the trusted time server.

13. The non-transitory machine-readable medium of claim 9, further comprising:

receiving, by the edge device of the edge devices, the synchronization response; and updating, by the edge device of the edge devices, a clock of the edge device of the edge devices with the time value.

14. The non-transitory machine-readable medium of claim 9, wherein the trusted time server maintains a globally-implemented time standard and provides information regarding the globally-implemented time standard.

15. A data processing system, comprising:

a processor; and a memory coupled to the processor to store instructions, which when executed by the processor, cause the processor to perform operations for securing edge devices, the operations comprising:

sending, by an edge orchestrator and to a trusted time server, a request for a true time value;

receiving, by the edge orchestrator and from the trusted time server, a response that comprises the true time value;

performing, by the edge orchestrator, a security verification process on the response from the trusted time server to verify integrity of the response;

making, by the edge orchestrator, a determination whether the integrity of the response is verified;

in a first instance of the determination where the integrity of the response is verified:

updating, by the edge orchestrator, a clock of the edge orchestrator with the true time value to obtain an updated clock;

receiving, by the edge orchestrator and from an edge device of the edge devices, a synchronization request for a time value; and sending, by the edge orchestrator and to the edge device of the edge devices, a synchronization response using the updated clock.

16. The data processing system of claim 15, further comprising:

in a second instance of the determination where the integrity of the response is not verified:

concluding that the response is untrustworthy.

17. The data processing system of claim 16, further comprising:

in the second instance of the determination where the integrity of the response is not verified:

sending, by the edge orchestrator and to the trusted time server, a second request for the true time value.

18. The data processing system of claim 16, further comprising:

in the second instance of the determination where the integrity of the response is not verified:

performing, by the edge orchestrator, an action set to reduce a security risk presented by interaction with the trusted time server.

19. The data processing system of claim 15, further comprising:

receiving, by the edge device of the edge devices, the synchronization response; and updating, by the edge device of the edge devices, a clock of the edge device of the edge devices with the time value.

20. The data processing system of claim 15, wherein the trusted time server maintains a globally-implemented time standard and provides information regarding the globally-implemented time standard.

\* \* \* \* \*